Nov. 24, 1936.　　　P. A. DUBUS　　　2,062,215

METHOD OF RECOVERING WASTE FLOUR AND DOUGH

Filed Sept. 20, 1934　　　2 Sheets-Sheet 2

Inventor
P. A. Dubus
By Ivan P. Tachof
Attorney

Patented Nov. 24, 1936

2,062,215

UNITED STATES PATENT OFFICE 2,062,215

METHOD OF RECOVERING WASTE FLOUR AND DOUGH

Peter A. Dubus, New Orleans, La.

Application September 20, 1934, Serial No. 744,817

4 Claims. (Cl. 209—2)

This invention relates to dough brakes and has special reference to the recovery of any excess of the dusting flour used in such machines to prevent sticking of the dough to the moving elements wherewith such dough contacts and to the recovery of any small lumps of dough that may stick to the moving parts.

Apparatus has been devised for this purpose wherein the dough lumps and excess dusting flour are delivered to a screen which is arranged to permit the dusting flour to pass through to a collecting receptacle while the dough particles remain on the screen. This apparatus has the objectionable result that the screen must be cleaned of such dough particles from time to time, since no means are provided therein for automatically clearing the screen of such dough particles.

One important object of the invention is to provide an improved apparatus of this character wherein novel means of screening are used which effectively removes the dough particles from the screen automatically.

A second important object of the invention is to provide novel means, in a device of this kind, whereby the excess dusting flour may be gathered in one section of a collecting box and the dough lumps may be gathered in a second section of such collecting box.

A third important object of the invention is to provide an improved collecting box for such devices, which box has separate compartments for excess dusting flour and for the dough lumps.

With the above and other objects in view, the invention consists in general of certain novel details of construction and combinations of parts hereinafter fully described, illustrated in the accompanying drawings and specifically claimed.

In the accompanying drawings like characters of reference indicate like parts in the several views, and:

Figure 1:
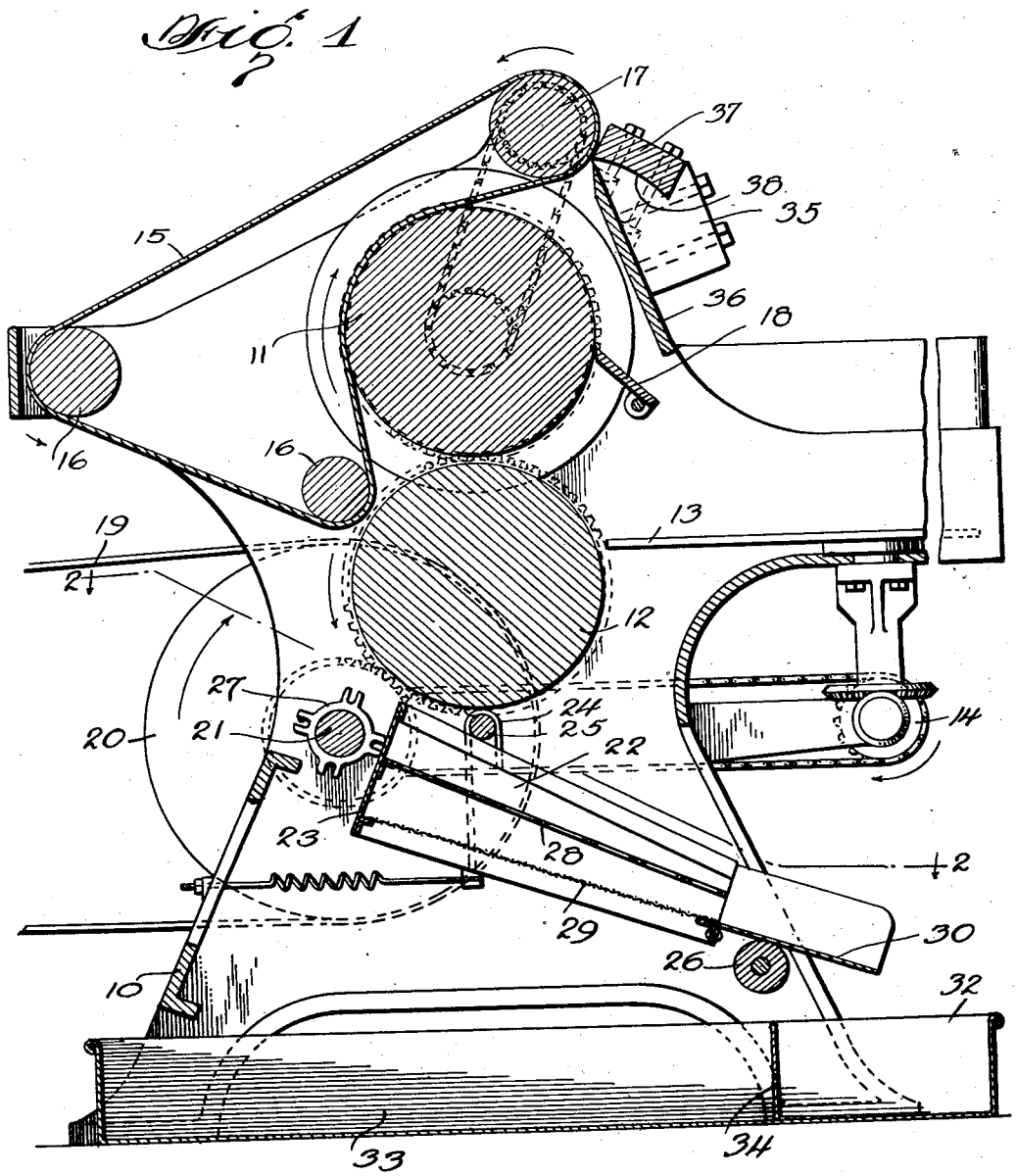
Figure 1 is a vertical medium section taken longitudinally through a dough brake provided with the improved screening device.
Figure 2:
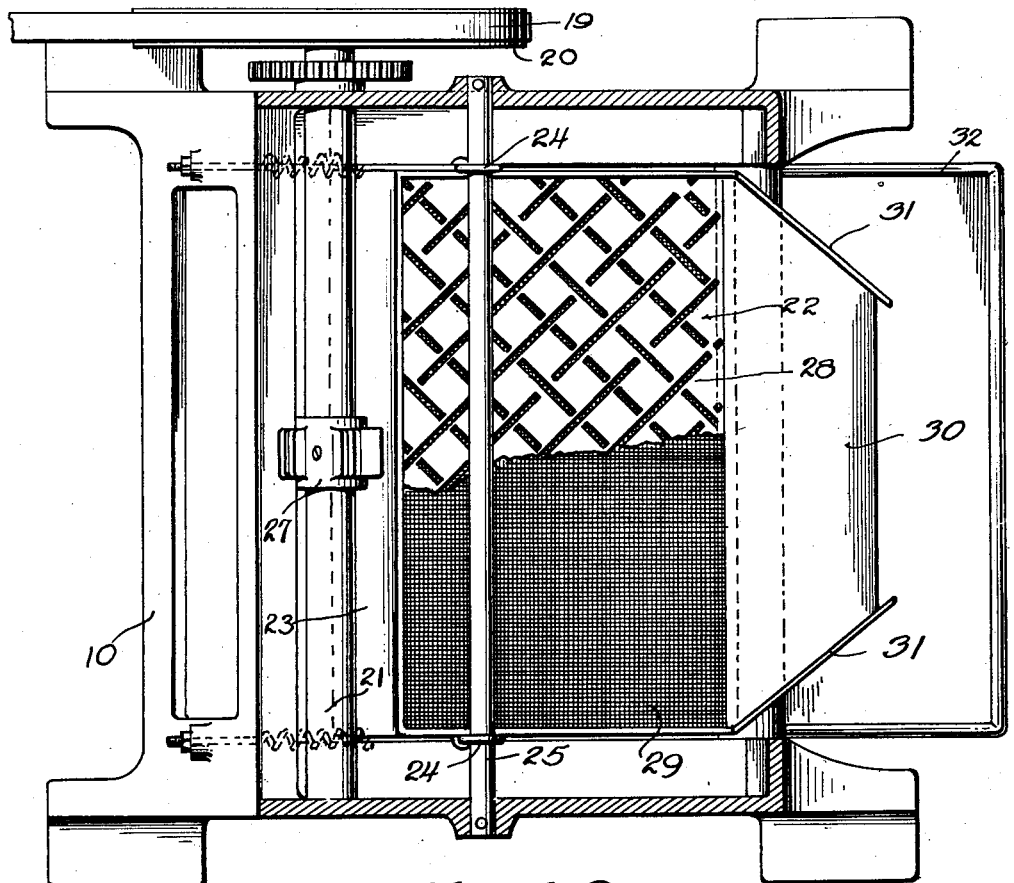
Figure 2 is an enlarged detail section on the line 2—2 of Figure 1.
Figure 3:
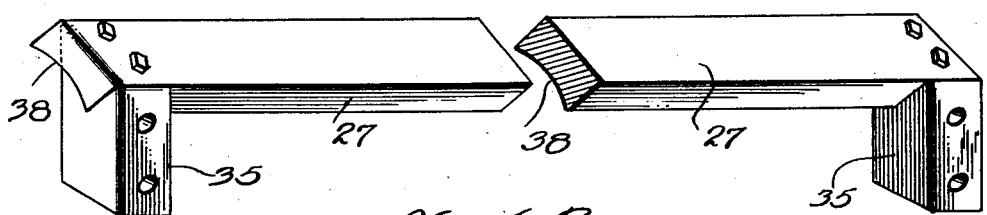
Figure 3 is a perspective view of the scraper for removing the dough particles or lumps from the belt.

The dough brake to which this screening device is applied is of the general type shown in the patent to G. A. Bohnet, No. 1,551,131 of August 25, 1925.

Such a dough brake is provided with a frame 10 wherein are revolubly mounted an upper horizontal roll 11 and a lower horizontal roll 12 cooperating with the upper roll 11 to roll dough between them, these rolls revolving in the directions shown by the arrows thereon. At the forward part of the dough brake is a turn-table 13 which is located below the horizontal plane. This turntable is geared to the rolls by gearing indicated at 14. A belt 15 laps the rear upper segment of the roll 11 and runs over idler rolls 16, the belt being driven by suitable means such as is shown at 17 in general. A scraper 18 scrapes the dough off the roll 11 to return it to the turn-table 13. The entire machine is driven by a belt 19 running over a pulley 20 fixed on a shaft 21, geared to the lower roll. This shaft 21 also drives the gearing 14.

A screen frame having side members 22 and a rear member 23, is supported in inclined position below the rolls by hangers 24 engaged on a rod 25 extending between the sides of the frame 10. By means of this suspension the screen frame is permitted to have an oscillating movement, its forward end being supported on a roll 26. An oscillator 27 is fixed on the shaft 21 and engages the rear of the screen frame to intermittently push it forward against the action of springs, each having one end attached to a hanger 24, and its other end attached to a suitable rear part of the frame 10. Thus during the operation of the machine the screen frame is constantly oscillated. This screen frame supports an upper coarse screen 28 and a lower fine screen 29 at the front end of which is an imperforate delivery apron 30 forming an extension of the lower screen, the side walls at this apron converging as at 31.

Beneath the screen device is a collecting box or tray having a forward compartment 32 and a rear compartment 33, the partition 34 between these two compartments being so located that all material delivered from the apron 30 will fall into the forward compartment while the material dropping through the screen 29 will fall into the rear compartment. This box or tray is removable so that the material collected therein, can be removed.

In order that such lumps of dough as may cling to the belt may be removed, there are provided blocks 35 which are bolted to the frame 10 at the opposite ends of a cross frame member 36. These blocks support a scraper bar 37 having a concave lower face 38, the rear edge of which lies close to the belt 15 so that any dough lumps or particles which may adhere to said belt will be scraped off as the belt passes this scraper.

In operation the excess dusting flour and the small lumps or particles of dough which are not returned to the turntable drop down on the upper screen 28. Here the larger dough lumps are separated from the smaller dough lumps and excess dusting flour, the larger lumps passing down the screen 28 and off the lower forward end thereof onto the apron 30, while the smaller dough lumps and flour which find their way through the screen 28 drop onto the screen 29. Here, the dough lumps are separated from the dusting flour, the lumps passing off the screen onto the apron 30 while the flour passes through the screen 29 into the compartment 33. It may be noted in the drawings that the screen 28 is inclined at a steeper angle to the horizontal than the screen 29. This is done in order to enable the larger dough particles to roll more easily down the inclined screen and prevent the sticking to the screen of these larger particles. The screen 28 cannot be inclined at this same steep angle because the smaller dough particles and flour would not stay on the screen 28 long enough at such angle to secure an efficient separation of the small dough particles and flour. All dough lumps which pass onto the apron 30 drop off the end of that table into the dough compartment or section 32 of the collecting box or tray. Thus, when the tray is removed the dusting flour and dough lumps or particles will be held thereby in a separated condition.

There has thus been provided a simple and efficient device of the kind described and for the purpose specified.

It is obvious that minor changes may be made in the form and construction of the invention without departing from the material principles involved. It is not, therefore, desired to confine the invention to the exact form herein shown and described, but it is desired to include all such forms as come within the scope of the appended claims.

What is claimed is:—

1. That process of recovering waste dusting flour and dough particles from a dough brake which consists in collecting all waste flour and dough particles, subjecting the combined waste flour and dough particles to a screening operation to separate the larger dough particles from the smaller dough particles and flour, subjecting the separated smaller dough particles and flour to further screening, to separate the flour from the smaller dough particles, collecting the separated flour, uniting the separated larger and smaller dough particles, and delivering the united larger and small dough particles to a common receptacle.

2. The process of recovering waste dusting flour and dough particles from a mixture of small and large dough particles and flour, which comprises subjecting the mixture to an initial separating operation to separate the larger dough particles from the smaller dough particles and flour on a separator adapted to permit the efficient separation of the small dough particles and flour from the large dough particles while inhibiting the sticking of the large dough particles thereto, and then subjecting the smaller dough particles and flour to a second separating operation to separate the smaller dough particles from the flour and combining the separated smaller and larger dough particles.

3. The process of recovering waste dusting flour and dough particles from a mixture of small and large dough particles and flour which comprises subjecting the mixture to an initial screening operation to separate the larger dough particles from the smaller dough particles and flour on a screen adapted to permit the efficient separation of the small dough particles and flour from the large dough particles while inhibiting the sticking of the large dough particles thereto, and then subjecting the smaller dough particles and flour to a second screening operation to separate the smaller dough particles from the flour and combining the separated smaller and larger dough particles.

4. The process of recovering waste dusting flour and dough particles from a mixture of small and large dough particles and flour which comprises subjecting the mixture to an initial screening operation to separate the larger dough particles from the smaller dough particles and flour on a screen inclined at a comparatively steep angle to the horizontal so as to permit the efficient separation of the small dough particles and flour from the large dough particles while inhibiting the sticking of the large dough particles thereto, and then subjecting the smaller dough particles and flour to a screen inclined at a lesser angle to the horizontal so as to more efficiently separate the small dough particles from the flour, and combining the smaller and larger dough particles.

PETER A. DUBUS.